INVENTORS
JOSEPH H. CYR &
LAWRENCE M. HALLS
BY Donald D. Schaper
ATTORNEY

INVENTOR
JOSEPH H. CYR &
LAWRENCE M. HALLS
BY Donald D. Schaper
ATTORNEY

Dec. 29, 1970   L. M. HALLS ET AL   3,550,363
HARVESTER
Original Filed Oct. 26, 1966   3 Sheets-Sheet 3

INVENTORS
JOSEPH H. CYR &
LAWRENCE M. HALLS
BY Donald D. Schaper
ATTORNEY

United States Patent Office 3,550,363
Patented Dec. 29, 1970

3,550,363
HARVESTER
Lawrence M. Halls, New Holland, Pa., and Joseph H.
Cyr, Longvic, France, assignors to Sperry Rand Corporation, New Holland, Pa., a corporation of Delaware
Continuation of application Ser. No. 589,706, Oct. 26,
1966. This application Dec. 15, 1969, Ser. No. 884,766
Int. Cl. A01d *43/10*
U.S. Cl. 56—23                                    13 Claims

ABSTRACT OF THE DISCLOSURE

A harvesting machine, having a wheel supported frame, a header, pivotally secured to the frame, transversely extending conditioning rolls mounted in the header and spring means for supporting the header and yieldably biasing the rolls together, whereby the header may float relative to the ground and the rolls may separate when excessive amounts of material are passed between them.

---

This is a continuation of application Ser. No. 589,706, filed Oct. 26, 1966, now abandoned.

The present invention relates generally to agricultural machines of the harvester type and like apparatus having adjustable crop gathering headers. More particularly, the invention relates to an improved header balance and roll tensioning means in a mower-conditioner.

In a mower-conditioner of the type of which the invention is particularly applicable, the machine frame comprises a transversely extending rockshaft which is supported on a pair of axially spaced and radially extending wheel arms, each of which carries a ground engaging wheel. A header is pivotally mounted on the rockshaft and is vertically adjusted by simultaneously pivoting the header about the rockshaft and moving the rockshaft in a vertical direction.

One object of the present invention is to provide means, in a mower-conditioner of the type described, for supporting the header in an operative position whereby the header can follow the contour of the ground and thereby uniformly sever standing crop material.

Another object of this invention is to provide a mower-conditioner header which is mounted for pivotal movement about a horizontal axis and is supported for a limited floating action during operation to compensate for changes in ground level.

Another object of this invention is to provide spring means for resiliently supporting a header in an operative position and positive lift means for moving the header to a transport position.

A further object of this invention is to provide a single spring means for supporting the header in an operative position and for yieldably pressing the conditioner rolls together whereby the rolls can separate if an excessive amount of material is passed between them.

A still further object of this invention is to provide means in a mower-conditioner for supporting the header and tensioning the conditioner rolls which is simple, efficient, and readily accessible for maintenance and adjustment.

Other objects of this invention will be apparent hereinafter from the specification and from the recital in the appended claims.

Figure 1:
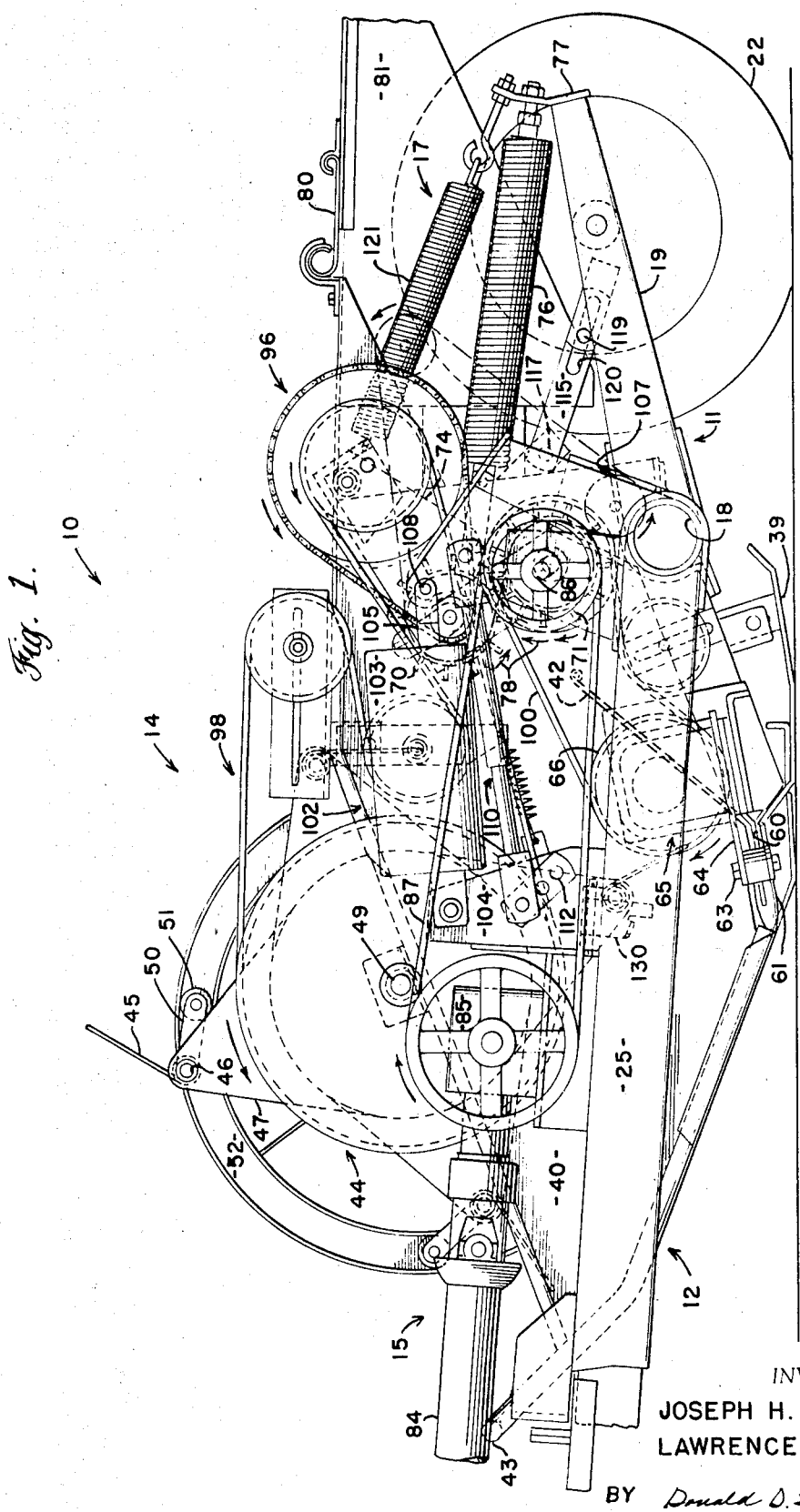
FIG. 1 is a side elevational view of a mower-conditioner and showing the header balance and roll tensioning device constructed in accordance with the principles of the present invention.
Figure 2:
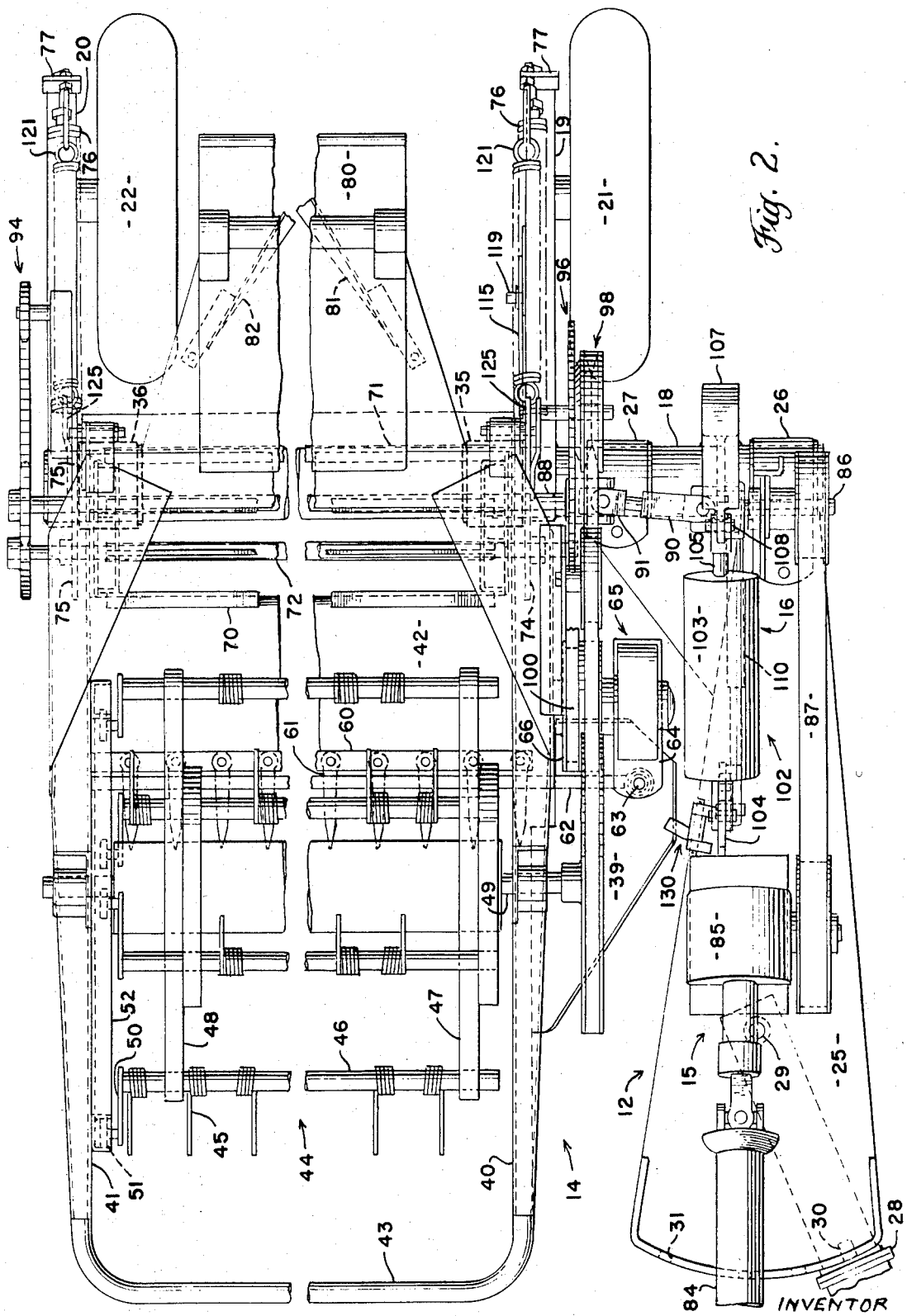
FIG. 2 is a plan view of FIG. 1 with the central portion of the machine broken out to condense the figure.

Referring now to the drawings by numerals of reference, and particularly to FIGS. 1 and 2, the machine of this invention is designated generally 10 and comprises a transversely extending frame structure 11, a draft frame 12 along what will be referred to as the inboard side of the machine, a header 14 which extends from adjacent the draft frame to the opposite machine side, referred to as the outboard side, a drive system 15 which furnishes power to crop treating elements carried on header 14, power means 16 for vertically adjusting header 14, and header balance and roll tensioning means 17.

Frame structure 11 consists of a rockshaft 18, and inboard wheel arm 19 fixed to rockshaft 18, as by welding, an outboard wheel arm 20 fixed to rockshaft 18, and a pair of wheels 21 and 22 journalled respectively in wheel arms 19 and 20.

Figure 3:
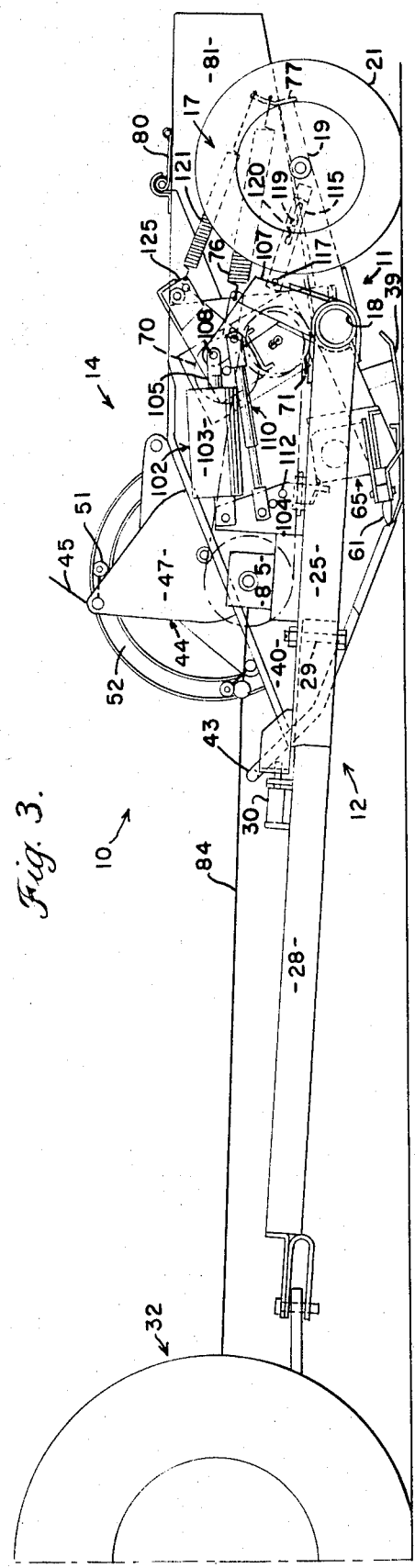
FIG. 3 is a side elevational view of the mower-conditioner, with the towing vehicle indicated fragmentarily at the forward end of the machine, and showing the header in an operative position.
Figure 4:
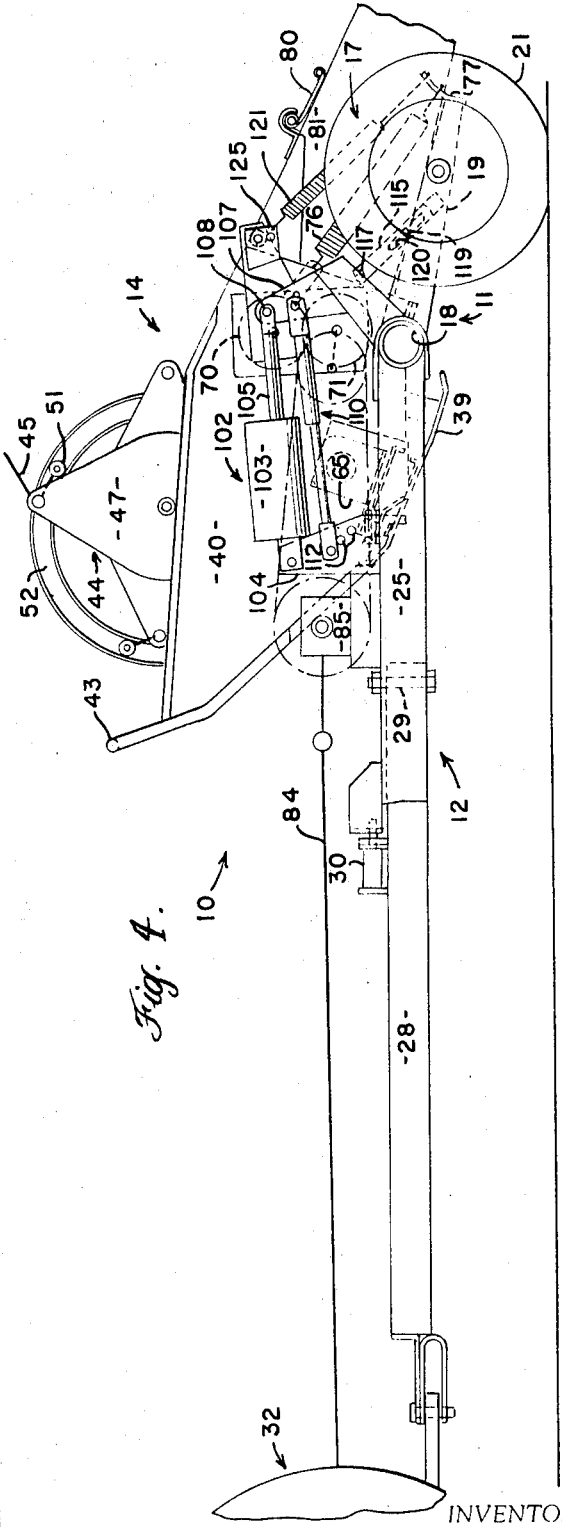
FIG. 4 is a view similar to FIG. 3, but showing the header in a raised position for transport.

Draft frame 12 comprises a massive center section 25 and a pair of rearwardly located bearing elements 26 and 27 which support draft frame 12 on rockshaft 18 for rotatable movement thereabout. A tongue 28 is pivotally mounted to center section 25 at 29 and has a pin member 30 which can be selectively positioned in any of a series of holes 31 in section 25, depending on the towing position desired. As shown in FIGS. 3 and 4, tongue 28 is adapted to be mounted to a towing vehicle 32, indicated fragmentarily.

Header 14 is pivotally supported on rockshaft 18 by a pair of mounting sleeves 35 and 36. Header 14 is comprised of a subframe for supporting crop treating elements which consists of side panels 40 and 41, and a guide plate 42 extending between and joining the side panels at their lower edges. A pair of ground engaging guide shoes 39, one of which is shown in FIG. 1, is fixed to the lower edges of side panels 40 and 41 and serves to partially support the header 14 in an operative position. A crop engaging bar 43 extends across the forward end of the header 14.

A reel 44 is rotatably mounted in the header side panels 40 and 41 and has crop engaging fingers 45 which are carried on bars 46 at the outer periphery of the reel. Bars 46 are journalled in axially spaced spiders 47 and 48 which are carried on reel shaft 49. As seen in FIGS. 1 and 2, each of the bars 46 has a crank arm 50 carried on its outboard end. Each of the arms 50 carries a roller-type cam follower 51 at its one end. The followers 51 ride in a channel-shaped cam track 52 which causes the tines 45 to travel in the desired path in a well known and conventional manner.

A mower cutterbar 60, show in FIGS. 1 and 2, is mounted on header side panels 40 and 41 and extends therebetween. A plurality of conventional sickle guards 61 are mounted on cutterbar 60, and a sickle bar indicated at 62 reciprocates on the guards. As shown in FIG. 2, the inboard end of sickle bar 62 is pivotally connected at 63 to the forward end of a fore-and-aft extending rocker arm 64. Rocker arm 64 is reciprocated by a wobble drive 65 which receives power from an input pulley 66, as best shown in FIG. 1. Drive means for supplying power to input pulley 66 will be described hereinafter.

An upper conditioner 70 and a lower conditioner roll 71 are mounted to header side panels 40 and 41 at a location rearwardly of the mower and reel. Upper conditioner roll 70 includes a shaft 72 which is journalled in brackets 74 and 75 pivotally mounted respectively on panels 40 and 41. The pivotally mounted brackets 74 and 75 permit roll 70 to move toward and away from lower conditioner roll 71 to compensate for different loads of crop material. Roll tension springs 76 extending between brackets 74 and 75 and flanges 77 on wheel arms 19 and 20 serve to bias roll 70 toward lower roll 71. Rolls 70 and 71 rotate in the directions indicated by arrows 78 in FIG. 1, and a crop receiving bite is defined by the material engaging portion of the rolls just rearwardly of arrows 78.

A horizontally extending crop deflector plate 80 and windrow shields 81 and 82 are mounted at the rear end of header 14 to receive crop material from conditioner rolls 70 and 71 and to direct the material to the ground in the desired form.

Drive systems 15 (see FIGS. 1 and 2) comprises a power take-off shaft 84 which receives power from the towing vehicle and delivers it to a gearbox 85 on draft frame 12. Power is transmitted rearwardly by a belt 87 from gearbox 85 to a stub shaft 86, journalled at the rear end of draft frame 12. Shaft 86 drives lower roll shaft 88 through a pair of universal joints 90 and 91. Lower roll shaft 88 drives the upper roll shaft 72 through a chain drive 94 on the outboard side of the machine. Upper roll shaft 72 then transmits power, at the inboard side of the machine, to reel 44 through a chain drive shown at 96 and a belt drive shown at 98. A drive belt 100 transmits power from lower roll shaft 88 to the input pulley 66 on mower wobble drive 65.

It will be seen from the foregoing description that the reel, mower, and conditioner rolls will be continuously driven when ever power is furnished to gearbox 85 through power take-off shaft 84.

Power means 16 for moving header 14 from an operative position, as shown in FIG. 3, to a transport position, as shown in FIG. 4 is provided by a hydraulic actuator 102 which receives pressurized fluid from the towing vehicle 32 through a hydraulic power line, not shown. Hydraulic actuator 102 comprises a cylinder 103 which is fixed to a vertically extending bracket 104 of draft frame 12, and a reciprocating piston 105. Piston 105 serves to rotate rockshaft 18 through a bell crank 107 pinned to piston 105 at 108 and is welded, or fixed by other means, to rockshaft 18. A telescoping stop 110 is connected between bracket 104 and bell crank 107 to limit the movement of header 14 in a counterclockwise direction, as viewed in FIG. 4. Holes 112 are provided in bracket 104 so that stop 110 can be adjustably positioned thereon to determine the lowermost position of header 14.

Power means 16 transmits pivotal movement to header 14 through wheel arms 19 and 20 which are fixed at their inner radial ends to rockshaft 18, and through connecting links 115 which are fixed to header side panels 40 and 41 by pins 117. It will be seen that each link 115 is connected to its respective wheel arm by a pin 119 which extends through a slot 120 in link 115; thus, when wheel arms 19 and 20 are rotated, no pulling force will be exerted on header 14 by the connecting links 115 until pins 119 reach the ends of slots 120. A pair of springs 121, connected between flanges 77 on the wheel arms and brackets 125 on the header side panels, help to maintain the header in operating position.

A header stop 130 is provided to limit the upper limit of travel of header 14 when it is moved to the transport position. As shown in FIG. 2, header stop 130 is mounted to center section 25 of the draft frame 12 and is adapted to be pivoted out of the path of travel of header 14 when it is desired to raise the header above the transport position for maintenance or repairs.

An important feature of this invention is the header balance and roll tensioning means 17 which comprises springs 76 and 121, and connecting links 115. Header 14 is pivotally mounted on rockshaft 18, and in its operative position, it is partially supported on a pair of ground engaging guide shoes 39; the remainder of the header weight is supported by springs 76 and 121. It will be seen that when a field depression is encountered, the header will drop down so that the crop material is severed at a uniform height throughout the field. The lost-motion connection provided by pins 119 and slots 120 limits the downward movement of the header and prevents the header from over compensating for the depression. Springs 76 serve to tension the conditioner rolls and also to support the header. Under some operating conditions, springs 76 will be sufficient to support the header in the desired operating position. However, when the roll tension is relatively low, for example in light crops, additional springs 121 are needed to maintain the header in an operating position.

Operation of the machine is as follows:

As harvester 12 is towed through a field, the standing crop material is severed by the mower and is raked rearwardly by the crop engaging fingers 45 on the rotating reel 44. Fingers 45 deliver the material into the bite on conditioner rolls 70 and 71. The conditioner rolls discharge the material upwardly and rearwardly into windrow shields 81 and 82 which serve to consolidate the material and form it into a windrow. Header 14 will follow the contour of the ground in the above-described manner to evenly cut the crop material.

While this invention has been described in connection with a particular embodiment thereof, it will be understood that it is capable of modifications, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described our invention, what we claim is:

1. An agricultural machine adapted to travel through a field in a forward direction, said machine comprising:
   a wheel supported frame structure including a laterally extending rockshaft and means extending rearwardly of said rockshaft for raising and lowering said rockshaft;
   a subframe movably mounted on said rockshaft, said subframe carrying crop treating elements thereon including a pair of crop conditioning rolls extending transversely of said subframe and cooperable to condition crop material passing therebetween, one of said rolls being pivotally mounted in said subframe and movable toward and away from the other of said rolls; and
   roll tensioning and subframe support means extending between said means for raising and lowering said rockshaft and said subframe for tensioning said rolls and supporting said subframe.

2. An agricultural machine, as recited in claim 1, wherein said subframe comprises a pair of side panels and a pair of brackets pivotally mounted on said side panels, one on each panel, one of said rolls is journalled in said brackets and the other of said rolls is journalled in said side panels and said one roll is movable toward and away from said other roll.

3. An agricultural machine, as recited in claim 2, wherein said roll tensioning and subframe support means comprises a first pair of springs extending between said means for raising and lowering said rockshaft and said brackets.

4. An agricultural machine, as recited in claim 3, wherein roll tensioning and subframe support means further comprises a second pair of springs mounted between said means for raising and lowering said rockshaft and subframe side panels.

5. An agricultural machine adapted to travel through a field in a forward direction, said machine comprising:
   a wheel supported frame structure comprising a laterally extending rockshaft and a pair of spaced rearwardly extending wheel arms connected to said rockshaft and having a ground engaging wheel mounted thereon;

a subframe movably mounted on said rockshaft, said subframe supporting crop treating elements thereon including a pair of transversely extending crop conditioning rolls cooperable to condition crop material passed therebetween, one of said rolls being pivotally mounted in said subframe and movable toward and away from the other of said rolls; and roll tensioning and subframe support means extending between said wheel arms and said subframe for tensioning one of said rolls toward said other roll and supporting said subframe.

6. An agricultural machine, as recited in claim 5, wherein said subframe comprises a pair of side panels and a pair of brackets pivotally mounted on said side panels, one on each panel, one of said rolls is journalled in said brackets and the other of said rolls is journalled in said side panels and said one roll is movable toward and away from said other roll.

7. An agricultural machine, as recited in claim 6, wherein said roll tensioning and subframe support means comprises a first pair of springs extending between said wheel arms and said brackets.

8. An agricultural machine, as recited in claim 7, wherein roll tensioning and subframe support means further comprises a second pair of springs extending between said wheel arms and said subframe.

9. An agricultural machine, as recited in claim 5, wherein a draft frame is pivotally connected to said rockshaft at one end thereof and power means is provided for rotating said rockshaft to pivot said subframe and effect vertical adjustment of said crop treating elements.

10. An agricultural machine adapted to travel through a field in a forward direction, said machine comprising:

a wheel supported frame structure comprising a laterally extending rockshaft and a pair of rearwardly extending wheel arms, a ground engaging wheel being mounted on each of said arms;

a header pivotally mounted on said rockshaft and carrying a pair of crop conditioning rolls thereon, one of said rolls being pivotally movable with respect to the other of said rolls and cooperable therewith to condition crop material passed therebetween;

a draft frame pivotally connected to said rockshaft at one end thereof;

means connecting said header to said wheel arms, said means including spring means for simultaneously tensioning said rolls and supporting said header; and lift means for rotating said rockshaft to pivot said header and effecting vertical adjustment of said crop treating elements.

11. An agricultural machine, as recited in claim 10, wherein said connecting means further includes a lost motion connection extending between said wheel arms and said header and operative to permit the header to follow the contour of the ground with the limits of the lost motion connection.

12. An agricultural machine, as recited in claim 10, wherein said connecting means comprises a first pair of springs extending between said wheel arms and said header and operatively connected to said pivotally mounted roll for tensioning said roll.

13. An agricultural machine as recited in claim 12, wherein said connecting means further comprises a second pair of springs extending between said wheel arms and said header.

References Cited
UNITED STATES PATENTS

| | | | |
|---|---|---|---|
| 2,817,943 | 12/1957 | Collins | 56—208 |
| 2,811,819 | 11/1957 | Heth | 56—1C |
| 2,989,829 | 6/1961 | Heth et al. | 56—1C |
| 3,114,995 | 12/1963 | Krause | 56—1C |

ANTONIO F. GUIDA, Primary Examiner

U.S. Cl. X.R.

56—1, 208